Aug. 7, 1951    C. P. BERGSTROM ET AL    2,563,001
WARP BEAM FOR LOOMS
Filed Sept. 12, 1946
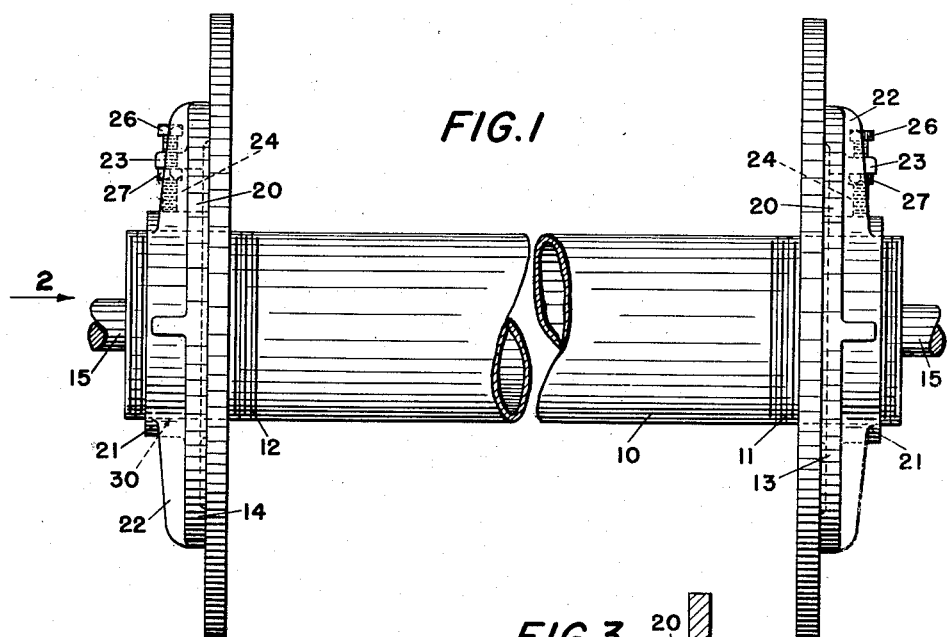
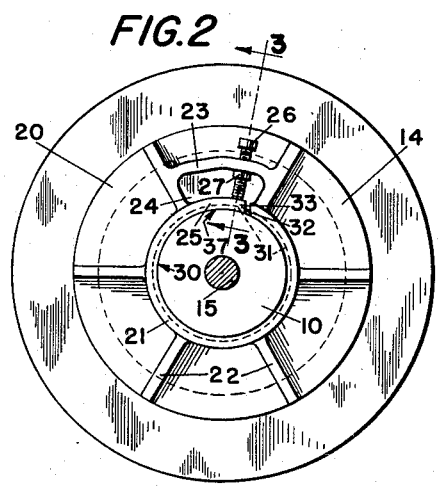
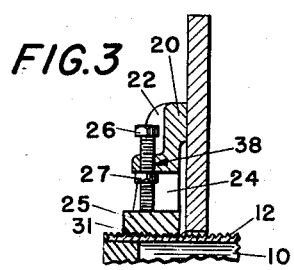
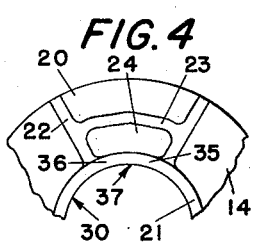
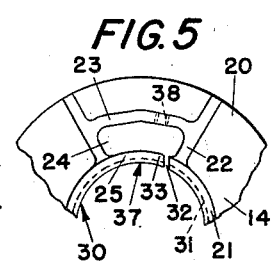
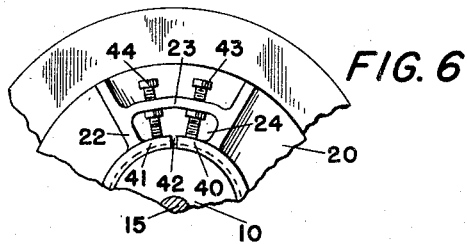
INVENTORS
CARL P. BERGSTROM
ROBERT S. SCHEDIN
Chas. T. Hawley.
ATTORNEY Patented Aug. 7, 1951

2,563,001

UNITED STATES PATENT OFFICE 2,563,001

WARP BEAM FOR LOOMS

Carl P. Bergstrom, Millbury, and Robert S. Schedin, Worcester, Mass., assignors to Crompton & Knowles Loom Works, Worcester, Mass., a corporation of Massachusetts Application September 12, 1946, Serial No. 696,452

6 Claims. (Cl. 242—124)

This is a continuation in part of our copending application Serial No. 636,946, filed December 22, 1945, now abandoned.

This invention relates to improvements in loom warp beams and it is the general object of the invention to provide an improved warp beam head having a slightly resilient pressure pad formed integrally as part of the hub of the head and capable of being flexed to serve as a clamp to secure the head firmly in adjusted position on the beam barrel.

It is a further object of the invention to provide the warp head hub with a pressure pad one end of which is cut free from the hub to be deflected by a pressure screw toward the axis of the hub and thereby clamp the hub and head on the barrel.

It is another object of the invention to provide the warp head hub with an integral pressure pad having an inner barrel engaging surface which is formed continuously with the bore of the hub and lies on the same cylindrical surface as the bore of the hub when the pad is in normal unflexed position. As shown hereinafter the bore is provided with screw threads to fit screw threads on the beam barrel, and these screw threads extend from the bore across the pad so that the pad threads are continuations of the hub threads. When the pad is in its normal position its screw threads slide over the screw threads of the barrel as do the threads of the hub, but when pressure is applied by the pressure screw the threads of the pad establish tight holding relation with the threads of the barrel. The pad threads are always aligned with the hub threads and there is no need for adjusting them to the barrel threads as is necessary with pads which are entirely separate from the hub.

It is a further object of the invention to make the warp head according to a novel method by which the pad is first made integrally with the head hub, then provided with a finished barrel engaging surface which as shown herein has screw threads which are continuations of the screw threads on the interior of the hub, and then cut on one side thereof from the hub to provide a free end which permits the pad to be flexed toward the hub axis by a pressure screw.

In the aforesaid copending application the pad is shown as formed with a pressure receiving boss which we find unnecessary and in some instances undesirable, and have omitted. The single pad shown in that application will bite into the barrel to resist rotation of the head in one direction on the barrel, but not in the opposite direction.

It is a further object of the invention to provide two opposed pads having free ends formed by a single cut, the pads biting into the surface of the warp beam to resist rotation of the head on the barrel in either direction.

With these and other objects in view which will appear as the description proceeds, our invention resides in the combination and arrangement of parts hereinafter described and set forth.

In the accompanying drawings, wherein two forms of the invention are set forth,

Fig. 1 is a front elevation of a warp beam having attached thereto warp heads made according to the preferred form of the present invention, Fig. 2 is a side elevation on a reduced scale of one of the warp beam heads looking in the direction of arrow 2, Fig. 1, Fig. 3 is an enlarged vertical section on line 3—3 of Fig. 2, Figs. 4 and 5 are diagrammatic views indicating the method by which the beam head of the preferred form is manufactured, and Fig. 6 is a view similar to part of Fig. 2 showing the modified form of the invention employing two opposed pads.

As shown in Fig. 1, which shows the preferred form of the invention, the beam head comprises a barrel 10 on which the warp is wound. The barrel is provided at the ends thereof with screw threads 11 and 12 receiving respectively the right and left hand warp heads 13 and 14. Supporting gudgeons 15 extend from opposite ends of the barrel to enable the beam to be rotatably supported either in a winding machine or a loom. The warp heads 13 and 14 are identical and a detailed description will be given of but one of them, namely, head 14 at the left of Fig. 1.

Warp head 14 is provided with a flange 20 the plane of which is perpendicular to the axis of barrel 10, and this flange is provided with an integral hub 21 extending along the barrel 10 and reinforced by radial ribs 22. A bridge or lug 23 extends between two of the ribs 22, as shown in the upper part of Fig. 2, and projects to the left of the flange 20 as a viewed in Fig. 1. Extending through the flange 20 is an opening 24 located between the hub and bridge 23 and the ribs to which the bridge is attached.

The hub 21 is integrally formed with one side of a pressure pad 25 which receives the downward or inward force exerted by a pressure screw 26 the lower end of which engages the pad and the upper part of which is threaded through the bridge 23. A lock nut 27 is tightened against the under side of bridge 23 to hold the screw in adjusted position. The opening 24 affords access to the nut 27 and also separates the pad from flange 20.

The hub and the pad have cut internally thereon a bore 30 provided with internal screw threads 31 to fit the screw threads 12 on the barrel 10, and the right hand side of the pad as shown in Fig. 2 is separated from the hub by a saw slot 32. This slot provides the pad with a free end 33 which receives the pressure of screw 26. The pad extends preferably for the length of the hub and is not directly connected to the flange 20.

The method of making the preferred form of beam head is suggested in Figs. 4 and 5. In the first step of manufacture the hub 21 and both the right and left sides 35 and 36, respectively, of the pad are made integral and continuous, see Fig. 4. We use cast iron, but the invention is not limited to this material. While the pad is still connected at both of its sides to the hub the bore 30 is cut and then the internal threads 31. These threads are cut in the inner surface 37 of the pad as well as the hub bore 30. At some time during the manufacture, either before or after the boring and thread cutting operations, the bridge 23 is tapped at 38 to receive the screw 26.

After the thread cutting operation of the hub and pad is completed, an appropriate tool, such as a saw not shown, is inserted through the opening 24 to cut the previously mentioned saw slot 32 at the right side 35 of the pad, Fig. 5. The opposite or left side 36 of the pad is left integral with the hub. The material of which the hub and pad is made is sufficiently resilient to permit a slight deflection of the free end 33 of the pad inwardly toward the axis of the hub when the screw 26 is turned down. Since the pad is integral with the hub its screw threads are always in register with the screw threads of the hub, and the pad and hub can be threaded together on the barrel. This threading occurs when the pad is in normal condition with its screw threads concentric with the axis of the warp head.

When the head is applied to the barrel the screw 26 will be raised to permit the pads to assume their normal condition and allow free turning of the warp heads on the barrel. When the heads have reached the desired position along the barrel the screw 26 is turned down to move the pads into clamping relation with the barrel. During this operation that part of the pad adjacent to the slot 32 has an appreciable motion sufficient to establish tight holding relation between its threads and those on the barrel.

The matter thus far described follows closely the disclosure of the aforesaid copending application except that the pad is of the same thickness throughout its length as at the hub, and therefore possesses more resilience.

As shown in Fig. 6 the hub and pad of the modified form of the invention are somewhat similar to those shown in the preferred form except that two opposed pads 40 and 41 are separated by a slot 42 which is preferably midway between the adjacent ribs 22. Two pressure screws 43 and 44 are threaded through the bridge 23, one for each pad. Under some conditions only one of these pressure screws will be needed, but where it is necessary to overcome considerable force tending to turn the warp head on the barrel both pressure screws may be tightened. The opposed pads bite into the barrel 10 and prevent rotary slippage of the head in both directions relatively to the barrel.

The method of manufacturing the modified form of the invention is substantially the same as that described for the preferred form except for the location of the slot and the provision of an additional pressure screw. The single slot provides the free ends of the two pads, and is wide enough to permit movement of the free ends to their holding positions.

From the foregoing it will be seen that we have provided a warp beam head having a pressure pad one side of which is integral with the hub and the opposite side of which is spaced from the hub and free so that it can be forced into clamping relation with respect to the beam barrel by a pressure screw. Since the pad is integral with the hub the threads cut on it are always in register with the threads cut on the hub and threading of the pad threads over the barrel threads when the warp head is threaded on the barrel is insured, no subsequent adjustment being needed to enable the threads of the pad to find the threads of the barrel. When the pad is in its normal condition its cylindrical surface 37 is concentric with the bore of the hub, hence the warp head can be rotated in either direction on the barrel screws. It will also be seen that the warp head is made by a simple process which requires a single cutting operation to free one side of the pad and condition it for flexing toward the barrel. It will further be seen in the modified form of the invention that two pads pointing in opposite directions are provided by a single cut and can be forced into close holding relation with respect to the beam barrel to prevent rotary movement of the warp head in either direction with respect to the barrel.

Having thus described our invention it will be seen that changes and modifications may be made therein by those skilled in the art without departing from the spirit and scope of the invention, and we do not wish to be limited to the details herein disclosed, but what we claim is:

1. In a beam head for a warp beam having a barrel, a warp engaging flange forming part of the head, a hub extending from and integral with the flange, a pressure pad extending circumferentially around part of the barrel and having one part thereof integral with the hub and having another part thereof separated from adjacent parts of the hub for limited free movement relatively to the hub, a bridge on the flange spaced radially from the barrel farther than the pad, ribs on the flange connecting the bridge and hub at points at either side of the pad, and a pressure screw threaded into the bridge at a point beyond the pad with respect to the barrel and engaging the pad to bend the latter into clamping relation with respect to the barrel.

2. In a warp head for a warp beam having a barrel, a warp engaging flange forming part of the head, a hub extending from and integral with the flange, a pressure pad extending circumferentially around part of the barrel and having one part thereof integral with the hub and having another part thereof arranged for limited free movement relatively to the hub, a bridge on the flange spaced radially from the barrel farther than the pad, ribs on the flange connecting the bridge and hub at points at either side of the pad, and a pressure screw threaded into the bridge and engaging said other part of the pad to force the latter against the barrel.

3. In a warp beam having a barrel, a warp head surrounding the barrel, a warp engaging flange forming part of the head, a hub extending from and integral with the flange, a pressure pad extending circumferentially around part of the barrel and having one side thereof integral with the hub and having another side thereof separated circumferentially from the first side and spaced from adjacent parts of the hub, said hub having a cylindrical bore to engage the barrel and the pad having a barrel engaging surface which is a cylindrical continuation of the bore when the pad is in normal position, a bridge extending laterally from the flange and connected to the hub and spaced farther from the barrel than the pad and radially aligned with the latter, and a pressure screw screw threaded into the bridge to engage the pad and deflect said other side thereof toward and into clamping relation with the barrel.

4. A beam head for a warp beam having a barrel provided with external screw threads, a warp engaging flange forming part of the head, a hub extending from and integral with the flange, a pressure pad extending circumferentially around part of the barrel and having one side thereof integral with the hub and having another side thereof movable relatively to the hub, said hub having internal screw threads continuous with screw threads on the pad, the screw threads of the hub and pad threaded onto the screw threads of the barrel, a bridge on the flange extending laterally therefrom and farther from the barrel than the pad, and a pressure screw screw threaded through the bridge to engage the pad and force the screw threads thereof against the screw threads on the barrel to clamp the head to the barrel.

5. In a warp head for a warp beam having a barrel, a warp engaging flange forming part of the head, a hub extending from and integral with the flange, a pair of opposed pressure pads integral with said hub and extending circumferentially around part of the barrel, each pad having a part thereof integral with the hub and having another part thereof close to but spaced from the corresponding part of the adjacent pad, a bridge on the flange extending therefrom and farther from the barrel than said pads, and a pressure screw screw threaded through the bridge for each pad to force the latter against the barrel.

6. In a warp beam having a barrel, a warp head surrounding the barrel, a hub extending from the head around the barrel, a pair of opposed pressure pads integral with said hub and extending partly around the barrel, said pads having adjacent sides separated and having the sides thereof remote from said adjacent sides integral with the hub, said pads extending in opposite circumferential directions from said adjacent sides, a bridge on the flange extending therefrom and farther from the barrel than said pads, and a pressure screw screw threaded through said bridge for each pad to force the latter against the barrel.

CARL P. BERGSTROM.
ROBERT S. SCHEDIN.

REFERENCES CITED

The following references are of record in the file of this patent:

UNITED STATES PATENTS

| Number | Name | Date |
| --- | --- | --- |
| 106,756 | Whitmore | Aug. 23, 1870 |
| 1,183,190 | Hansell | May 16, 1916 |
| 2,046,028 | Martin | June 30, 1936 |
| 2,280,270 | Stoner | Apr. 21, 1942 |

FOREIGN PATENTS

| Number | Country | Date |
| --- | --- | --- |
| 61,489 | Austria | May 1, 1913 |